(12) United States Patent
Adams

(10) Patent No.: US 8,308,498 B2
(45) Date of Patent: Nov. 13, 2012

(54) PLUG CONNECTOR WITH LATCH GUARD AND REMOVAL TOOLS

(75) Inventor: Darren Adams, Haverhill (GB)

(73) Assignee: Advanced Fiber Products Limited, Haverhill, Suffolk (GB)

( * ) Notice: Subject to any disclaimer, the term of this patent is extended or adjusted under 35 U.S.C. 154(b) by 0 days.

(21) Appl. No.: 13/218,949

(22) Filed: Aug. 26, 2011

(65) Prior Publication Data

US 2011/0318949 A1   Dec. 29, 2011

Related U.S. Application Data

(63) Continuation of application No. PCT/GB2010/000358, filed on Feb. 26, 2010.

(30) Foreign Application Priority Data

Feb. 26, 2009 (GB) .................................. 0903326.7
Sep. 8, 2009 (GB) .................................. 0915728.0
Oct. 1, 2009 (GB) .................................. 0917235.4

(51) Int. Cl.
*H01R 13/62* (2006.01)

(52) U.S. Cl. ....................................................... 439/304

(58) Field of Classification Search .................. None
See application file for complete search history.

(56) References Cited

U.S. PATENT DOCUMENTS

| | | | |
|---|---|---|---|
| 5,637,002 A | 6/1997 | Buck et al. | |
| 7,438,584 B2 * | 10/2008 | Caveney et al. | 439/344 |
| 7,578,690 B2 * | 8/2009 | Caveney et al. | 439/344 |
| 7,632,125 B2 * | 12/2009 | Irwin et al. | 439/304 |
| 7,722,378 B2 * | 5/2010 | Morrison et al. | 439/344 |
| 8,025,514 B1 * | 9/2011 | Wang | 439/172 |
| 8,038,456 B1 * | 10/2011 | Wang | 439/172 |
| 2005/0079750 A1 | 4/2005 | Foster | |
| 2006/0040564 A1 * | 2/2006 | Morrison et al. | 439/676 |
| 2006/0148279 A1 | 7/2006 | German et al. | |
| 2007/0207667 A1 * | 9/2007 | Caveney et al. | 439/587 |

FOREIGN PATENT DOCUMENTS

| | | |
|---|---|---|
| DE | 102004019757 | 1/2005 |
| WO | 2007016794 | 2/2007 |

* cited by examiner

*Primary Examiner* — Vanessa Girardi

(74) *Attorney, Agent, or Firm* — Chicago IP Law; Steven M. Evans

(57) ABSTRACT

A modular connector is provided comprising: a connector plug, which may be inserted into an associated socket in a first longitudinal direction; a resilient leg, depending at a first end thereof from the connector plug, and having a depressible part, distal therefrom, depressible towards the connector plug; and a guard cover, configured to prevent access to the depressible part of the resilient leg in its direction of depression, but to permit access to the resilient leg in the longitudinal direction through an access aperture, the access aperture being aligned with the depressible part of the resilient leg on an axis parallel with the longitudinal direction, to allow depression of the resilient leg through the access aperture directly. A corresponding extraction tool and methods, loop-back connector, blanking plug, blanking plate and patch panel are also provided.

20 Claims, 10 Drawing Sheets

PLUG CONNECTOR WITH LATCH GUARD AND REMOVAL TOOLS

CROSS-REFERENCE TO RELATED APPLICATIONS

This application is a continuation of international application number PCT/GB2010/000358, filed Feb. 26, 2010, entitled "Modular Connector," the entirety of which is hereby incorporated by reference. This application also claims priority to the following three applications previously filed in the United Kingdom (GB): (1) application number 0903326.7 filed on Feb. 26, 2009; (2) application number 0915728.0 filed on Sep. 8, 2009, and (3) application number 0917235.4, filed on Oct. 1, 2009; all three GB applications being incorporated by reference in their entirety.

TECHNICAL FIELD OF THE INVENTION

The present invention relates to a modular connector, a tool for releasing a modular connector from an associated socket, and a cap for modular connector. It also relates to a kit comprising a modular connector, and at least one of: a tool for removing the modular connector; and a cap for the modular connector. It further concerns: a modular loopback connector; a blanking plug for a modular socket; a blanking plate; and a patch panel.

BACKGROUND TO THE INVENTION

A modular connector is typically used with a cable for providing telephone or network signals. Modular connectors are generally referenced by the number of pin positions that they comprise and the number of contacts in the pin positions. Common modular connectors include the four position four connector (4P4C) used in telephone systems, and 8 position 8 connector (8P8C), commonly referred to as RJ45 (used for computer networking).

The socket for use with modular connectors comprises electrical contacts corresponding with those on the connector plug. The connector plug typically snap fits with the socket. A latch mechanism is commonly employed, such that when the latch is depressed the modular connector plug is released from the push-fit connection with the socket. Applying pressure to the latch is relatively quick and simple. By preventing depression of the latch, the modular connector can be secured in the socket.

WO-A-2007/016794 describes a means for locking a modular connector plug. A security device is fitted to the connector and prevents depression of the latch of the connector either by securing a fastening element underneath the latch or by providing a secured retaining means over the latch. The fastening element or retaining means is fixed in place by a locking mechanism that can only be removed by means of a key.

This approach adds significant complexity to the connector plug, and removal of the connector plug from the socket is time-consuming, even when using the key. Also, since the security device can be entirely removed, this may be done to save time when repeatedly connecting and disconnecting the connector, thereby compromising its security.

SUMMARY OF THE INVENTION

Against this background, the present invention provides a modular connector comprising: a connector plug, which may be inserted into an associated socket in a first longitudinal direction; a resilient leg, depending at a first end thereof from the connector plug, and having a depressible part, distal therefrom, depressible towards the connector plug; and a guard cover, configured to prevent access to the depressible part of the resilient leg in its direction of depression, but to permit access to the resilient leg in the longitudinal direction through an access aperture, the access aperture being aligned with the depressible part of the resilient leg on an axis parallel with the longitudinal direction, to allow depression of the resilient leg through the access aperture directly. The guard cover is advantageously arranged to prevent depression of the resilient leg without using a tool.

The present invention thereby provides a simple mechanism for inhibiting depression of the resilient leg (the release latch) on the modular connector. When the modular connector is fitted in a socket, access to the resilient leg is only possible from the rear portion of the modular connector. By limiting access in that rear portion to an opening, the present invention beneficially secures the modular connectors, such that it cannot be released without the use of a tool. However, by allowing a restricted form of direct access to the resilient leg even when the guard arrangement is in place, it provides a much simpler security mechanism in comparison with existing techniques.

By aligning the access aperture with the depressible part of the resilient leg, it becomes possible to use a tool to depress the resilient directly. No intermediate pieces are therefore needed release the guard cover or to depress the resilient leg. This allows for easy manufacture of the connector and integral formation of the guard cover with the connector plug. Optionally, the resilient leg is also integrally formed with the connector plug. Moreover, the arrangement advantageously allows direct depression of the resilient leg using an associated tool, which provides secure protection to prevent depression of the resilient leg that is more robust to component failure, since a minimum number of moving parts are needed.

In the preferred embodiment, the connector plug has a front portion comprising a plurality of electrical contacts and a rear portion, and the guard arrangement is further configured to restrict access to the resilient leg along the longitudinal direction of the connector plug from its rear portion to an opening. In some embodiments, the opening has a diameter of no greater than 5 mm. By diameter, the minimum dimension of the area of the opening is understood. This size prevents depression of the resilient leg directly using a hand. Alternatively, the opening has a diameter of no greater than one of: 4 mm, 3 mm, 2 mm or 1 mm.

Optionally, the connector plug and at least a part of the guard cover are integrally formed.

In a second aspect, the present invention is found in a modular connector, comprising: a connector plug; a resilient leg, depending at a first end thereof from the connector plug, and having a depressible part, distal therefrom, depressible towards the connector plug; and a guard cover, configured to inhibit access to the depressible part of the resilient leg and formed integrally with the connector plug. Preferably, the guard cover and connector plug are integrally moulded. The guard cover is advantageously arranged to prevent depression of the resilient leg without using a tool.

Optionally, the guard cover is further configured to prevent access to the depressible part of the resilient leg in its direction of depression, but to permit access to the resilient leg in the longitudinal direction through an access aperture, the access aperture being aligned with the depressible part of the resilient leg on an axis parallel with the longitudinal direction, to allow depression of the ~resilient leg through the access aperture directly.

Ancillary to the invention is a modular connector comprising: a connector plug; a resilient leg depending from the connector plug; and a guard cover positioned over the resilient leg to inhibit depression thereof. The guard cover and connector plug may be integrally formed.

A number of features may be applied to either of these two aspects of the present invention.

Preferably, the guard arrangement is rigid. This provides further protection against depression of the resilient leg through pressure on the guard arrangement. In the preferred embodiment, the connector plug and at least a part of the guard arrangement are integrally formed. More preferably, the connector plug and at least a part of the guard arrangement are integrally moulded. Optionally, the connector plug and at least a part of the guard arrangement are integrally moulded. This also improves the security of the guard arrangement by making it more difficult to remove.

The connector plug is preferably elongate and the resilient leg extends generally along the axis of elongation.

Preferably, the guard cover extends in the longitudinal direction at least to the location of a front face of the associated socket, when the connector plug is fully inserted into the associated socket, so as to prevent access to the resilient leg in its direction of depression.

In the preferred embodiment, the guard cover comprises a bridge over the resilient leg, the bridge having supports surrounding the resilient leg and a span joining the supports and spaced from the resilient leg. Where the guard cover extends at lest to the front face of the socket, the bridge may further comprise at least one projection extending in the longitudinal direction towards the first end of the resilient leg to prevent access to the resilient leg in its direction of depression.

Optionally, one end of the projection is pivoted to the bridge span, the bridge span further comprising a notch arranged such that a force in the longitudinal direction against the projection causes it to be pushed into the notch in the bridge span. Advantageously, the projection is configured such that at least a portion of the projection extends in the longitudinal direction towards the first end of the resilient leg to prevent access to the resilient leg in its direction of depression when the projection is pushed into the notch.

Beneficially, a region bounded by the bridge span, the bridge supports and the connector plug defines the access aperture. Optionally, the access aperture is further bounded by a barrier adjacent to the bridge. Beneficially, the barrier is shaped to act as a guide towards the access aperture. In preference, the barrier comprises at least one ramp. The ramp-shape provides this guide functionality which allows a tool to be more easily aligned and inserted into the access aperture.

Additionally or alternatively, the underside of the bridge span has formed therein at least one of: one or more notches; and one or more protrusions.

These can advantageously create the effect of a lock, such that only a tool with corresponding formations can cause depression of the resilient leg.

In the preferred embodiment, the modular connector is an 8-position 8-contact connector. In other words, the modular connector comprises eight electrical contacts. Alternatively, the modular connector may be a 4-position 4-contact connector.

Optionally, the resilient leg is further arranged to having a lug formed thereupon for engagement with a flange of an associated socket.

In some embodiments, the modular connector further comprises a Radio Frequency Identification (RFID) tag.

In a third aspect, the invention may be found in a kit comprising the modular connector as described herein and a tool, the tool comprising: a tool body; a resilient arm depending from the tool body; and a tongue formed upon or adjacent a distal end of the resilient arm and adapted to pass through the access aperture of the modular connector and depress the resilient leg of the modular connector.

Advantageously, the tool body defines an inner volume for receiving the rear portion of the modular connector. This allows alignment of the extraction tool with the modular connector. Optionally, the tongue of the tool comprises at least one of: one or more notches; and one or more protrusions. This allows the extraction tool to include key-like formations to cooperate with lock-like formations on the guard cover of the associated modular connector. The kit optionally further comprises a cap for removal of the tool from the opening of the modular connector.

In a fourth aspect, the present invention may be found in a kit comprising: the modular connector as described herein; and a cap having a body that defines an inner volume for receiving the front portion of the modular connector. Preferably, the cap is generally elongate and further comprises an arm projecting from the cap body along the direction of elongation. In the preferred embodiment, the arm is ramp-shaped at its distal end. In some embodiments, the cap further comprises a flange for abutting the one or more lugs on the resilient leg of the modular connector.

In a fifth aspect, there may be found a tool for releasing a modular connector from an associated socket, comprising: a tool body defining an inner volume for receiving a portion of the modular connector; a resilient arm depending from the tool body; and a tongue formed upon or adjacent a distal end of the resilient arm. This extraction tool allows depression of the resilient leg of an associated modular connector. Optionally, the tongue comprises at least one of: one or more notches; and one or more protrusions.

In a sixth aspect of the present invention, there is provided a cap for a modular connector, the cap being generally elongate and comprising: a cap body that defines an inner volume for receiving a front portion of the modular connector, having a plurality of electrical contacts; and an arm projecting from the cap body along the direction of elongation. Preferably, the arm is ramp-shaped at its distal end. Optionally, the cap further comprises a flange for abutting a lug on the modular connector. In the preferred embodiment, the cap further comprises a resilient clip depending from the cap body, and wherein the flange is formed on the resilient clip.

In a seventh aspect, there is provided a method of inhibiting removal of a modular connector from an associated socket, the method comprising the steps of: providing a modular connector having: a connector plug, which may be inserted into the associated socket in a longitudinal direction; and a resilient leg depending, at a first end from the connector plug and having a depressible part, distal therefrom, depressible towards the connector plug; and providing a guard cover upon the modular connector, configured to prevent access to the depressible part of the resilient leg in its direction of depression, but to permit access to the resilient leg in the longitudinal direction through an access aperture, the access aperture being aligned with the depressible part of the resilient leg on an axis parallel with the longitudinal direction, to allow depression of the resilient leg through the access aperture directly.

In an eighth aspect, there may be considered a method of actuating a resilient leg of a modular connector, the connector comprising: a connector plug, which may be inserted into an associated socket in a longitudinal direction; a resilient leg depending at a first end thereof from the connector plug, and having a depressible part, distal therefrom, depressible towards the connector plug; and a guard cover, configured to prevent access to the depressible part of the resilient leg in its direction of depression, but to permit access to the resilient leg in the longitudinal direction for its depression. The method comprises: passing a tool in the longitudinal direction of the connector plug, beneath the guard cover of the connector; and applying the tool directly to the depressible part of the resilient leg.

Also conceived is a kit comprising a modular connector and an associated tool configured to carry out this method.

In a ninth aspect, a method of extracting a modular connector comprising a guard cover from an associated socket is provided, using a tool having a resilient leg and a tongue formed upon or adjacent a distal end of the resilient leg. The method comprises: passing the tongue through the guard cover of the connector; and directly engaging with and depressing the resilient leg of the connector.

In a tenth aspect, a method of extracting a modular connector from a socket is provided, the modular connector having a connector plug and a resilient leg depending from the connector plug, a proximal end of the resilient leg being engaged with the socket so as to prevent removal of the modular connector from the socket. The method comprises: inserting an extraction tool into the modular connector such that the extraction tool depresses the resilient leg directly and thereby disengages the resilient leg from the socket; and extracting the modular connector from the socket.

In all of these methods, the resilient leg preferably has a depressible part distal from its proximal end. Optionally, the modular connector further comprises a guard cover, configured to prevent access to the depressible part of the resilient leg in its direction of depression, but to permit access to the resilient leg through an access aperture in a longitudinal direction, in which the connector plug can be inserted into a socket, the access aperture being aligned with the depressible part of the resilient leg on an axis parallel with the longitudinal direction, to allow depression of the resilient leg through the access aperture directly. Advantageously, the step of inserting the extraction tool comprises accessing the resilient leg along that longitudinal direction.

Optionally, the access aperture is defined by the resilient leg and the guard cover.

Preferably, the modular connector further comprises a barrier element located adjacent the depressible part of the resilient leg, and wherein the access aperture is defined by the resilient leg, the guard cover and the barrier element.

Advantageously, the extraction tool comprises a tongue and, the method further comprises: aligning one or both of: projections; and notches on the tongue with corresponding one or both of: notches; and projections on the guard arrangement. This causes the tool to act as a key.

Beneficially, the step of inserting the extraction tool into the modular connector comprises engaging the extraction tool with the modular connector, said engagement preventing removal of the extraction tool from the modular connector.

In some embodiments, the method further comprises: disengaging the extraction tool from the modular connector by inserting the modular connector into one of: a socket; and a cap; and removing the extraction tool from the modular connector.

Optionally, the step of engaging the extraction tool with the modular connector comprises engaging the extraction tool with the guard cover.

In an eleventh aspect, there may be found a modular loopback connector comprising: a connector plug, which may be inserted into an associated socket in a longitudinal direction; a resilient leg, depending at a first end thereof from the connector plug, and having a depressible part, distal therefrom, depressible towards the connector plug; a guard cover, configured to prevent access to the depressible part of the resilient leg in its direction of depression, but to permit access to the resilient leg in the longitudinal direction through an access aperture, the access aperture being aligned with the depressible part of the resilient leg on an axis parallel with the longitudinal direction, to allow depression of the resilient leg through the access aperture directly; and an electrical connection, arranged to send signals received from the associated socket back into the associated socket.

In a variant on this aspect, there is provided a modular loopback connector comprising: a connector plug; a resilient leg, depending at a first end thereof from the connector plug, and having a depressible part, distal therefrom, depressible towards the connector plug; a guard cover, positioned over the resilient leg to inhibit depression thereof and formed integrally with the connector plug; and an electrical connection, arranged to send signals received from the associated socket back into the associated socket.

In the eleventh aspect or its variant, the electrical connection may optionally further comprise a signal processor arranged to process the signals received from the associated socket. Optionally, the resilient leg has one or more lugs formed thereupon for engagement with a flange of a modular socket. In one embodiment, the electrical connection optionally attenuates a signal which passes therethrough. In other words, the signal processor comprises an attenuator. Optionally, the modular loopback connector further comprises an insignia associated with a particular coefficient of attenuation provided. In other embodiments, the signal processor may comprise a filter. Advantageously, the filter is passive.

In the preferred embodiment, the guard cover comprises a bridge over the resilient leg, the bridge having supports surrounding the resilient leg and a span joining the supports and spaced from the resilient leg. Optionally, a region bounded by the bridge span, the bridge supports and the connector plug defines the access aperture. Advantageously, the access aperture is further bounded by a barrier adjacent to the bridge. Beneficially, the barrier comprises at least one ramp.

In some embodiments, the underside of the bridge span has formed therein one or more notches and/or one or more protrusions. Optionally, the modular loopback connector further comprises a Radio Frequency Identification (RFID) tag.

In a twelfth aspect, there is provided a blanking plug for a modular socket, the plug comprising: a connector plug, which may be inserted into an associated socket in a first longitudinal direction; a resilient leg, depending at a first end thereof from the connector plug, and having a depressible part, distal therefrom, depressible towards the connector plug; and a guard cover, configured to prevent access to the depressible part of the resilient leg in its direction of depression, but to permit access to the resilient leg in the longitudinal direction through an access aperture, the access aperture being aligned with the depressible part of the resilient leg on an axis parallel with the longitudinal direction, to allow depression of the resilient leg through the access aperture directly.

In a variant on the twelfth aspect, a blanking plug for a modular socket is provided, the plug comprising: a connector plug; a resilient leg, depending at a first end thereof from the connector plug, and having a depressible part, distal therefrom, depressible towards the connector plug; and a guard cover, positioned over the resilient leg to inhibit depression thereof and formed integrally with the connector plug.

In either the twelfth aspect or its variant, the connector plug optionally comprises a stopper for engagement with a modular socket. Optionally, the resilient leg has one or more lugs formed thereupon for engagement with a flange of a modular socket. Optionally, the guard cover comprises a bridge over the resilient leg, the bridge having supports surrounding the resilient leg and a span joining the supports and spaced from the resilient leg. Advantageously, a region bounded by the bridge span, the bridge supports and the connector plug defines the access aperture. Beneficially, the access aperture is further bounded by a barrier adjacent to the bridge. Optionally, the barrier comprises at least one ramp.

In the preferred embodiment, the underside of the bridge span has formed therein one or more notches and/or one or more protrusions.

In some embodiments, the blanking plug further comprises a Radio Frequency Identification (RFID) tag.

In a thirteenth aspect, there may be found a blanking plate comprising: a plate; at least one blanking plug as described herein or at least one modular connector as described herein, fitted on the plate such that the plate covers a plurality of modular sockets when the at least one blanking plug or at least one modular connector is fitted into an associated socket. Optionally, the blanking plugs further comprises a blanking plug mount for fixing a blanking plug or a modular connector to the plate, the blanking plug mount being arranged to allow adjustment of the position of the blanking plug or the modular connector on the plate. Optionally, the blanking plug mount comprises runners mounted on a hole in the plate and a sliding mechanism adapted to allow the blanking plug or the modular connector to slide within the hole of the plate.

In a fourteenth aspect there is provided a patch panel comprising a plurality of modular sockets, wherein at least one of the modular sockets is occupied either by a modular loopback connector or by a blanking plug. Optionally, every one of the sockets is occupied by: a modular loopback connector; a blanking plug; or a modular connector.

Optionally, at least one of the sockets is occupied by a blanking plug, wherein the blanking plug is as described herein.

Additionally or alternatively, at least one of the sockets is occupied by a modular loopback connector, wherein the modular loopback connector is as described herein.

Alternatively or additionally, at least one of the sockets is occupied by a modular connector, wherein the modular connector is as described herein.

BRIEF DESCRIPTION OF THE DRAWINGS

Embodiments of the invention will now be described, by way of example only, with reference to the accompanying drawings, in which:

FIG. 9b shows a side view of the embodiment of FIG. 9a;

FIG. 9c shows a front end view of the modular connector of FIG. 9a;

FIG. 9d shows a perspective view of the modular connector of FIG. 9a;

FIG. 10b shows a rear end view of the blanking plug of the blanking plug of FIG. 10a;

FIG. 10c shows a side view of the blanking plug of FIG. 10a;

FIG. 10d shows a front end view of the blanking plug of FIG. 10a;

FIG. 10e shows a perspective view of the blanking plug of FIG. 10a;

FIG. 12b shows a side view of the embodiment of FIG. 12a;

FIG. 12c shows a front end view of the embodiment of FIG. 12a; and

FIG. 12d shows a perspective view of the embodiment of FIG. 12a.

DESCRIPTION OF A SPECIFIC EMBODIMENT

Figure 1:
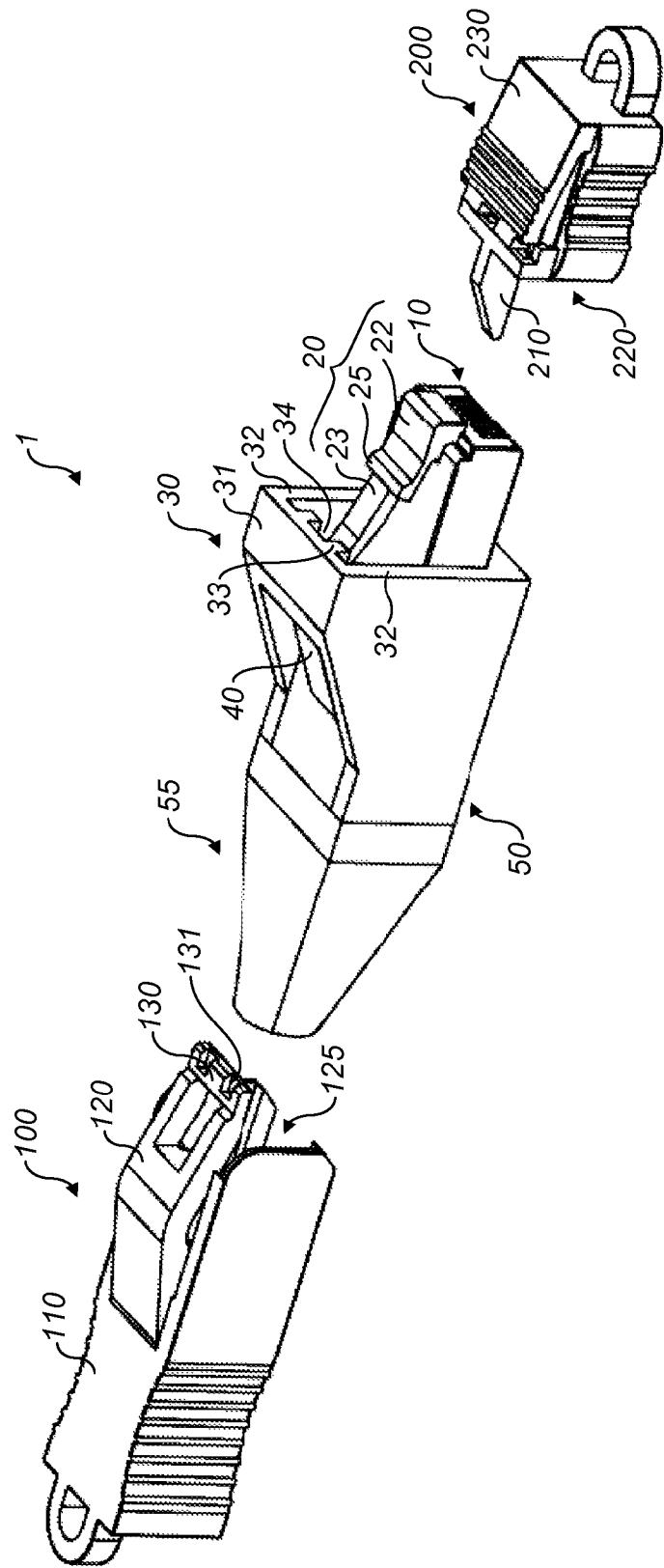
FIG. 1 shows a perspective view of a modular connector, a tool for removing the modular connector and a cap for the modular connector according to the present invention.
Figure 2:
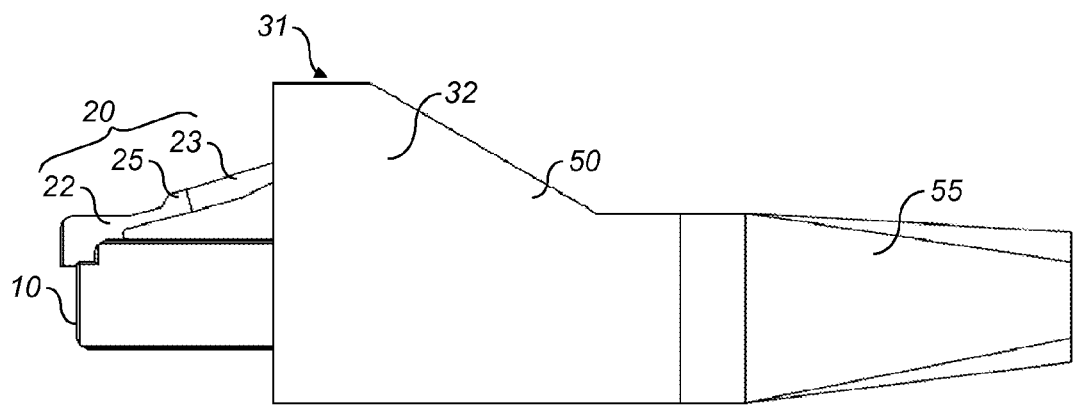
FIG. 2 shows a side view of the modular connector of FIG. 1.

Referring first to FIG. 1, there is shown a modular connector according to the present invention. The modular connector 1 has a housing 50 and a connector plug 10. It further comprises a release latch 20, a guard cover 30 and barrier element 40.

The modular connector 1 is elongate and comprises release latch 20 which is a resilient leg that depends at one end 22 of the leg 20 from an end of the connector plug 10 opposite to the housing 50. The resilient leg 20 extends generally along the axis of elongation of the connector plug 10 and connector 1. A lug 25 is formed on one side of the resilient leg 20 so as to protrude from the resilient leg 20 in a direction perpendicular to the axis of elongation.

The guard cover 30 is positioned over the end 23 of the resilient leg 20 away from the end 22 at which the resilient leg 20 depends from the connector plug 10.

The guard cover 30 comprises a bridge with a span 31 and two supports 32. The span 31 covers the resilient leg 20. The supports 32 are located at the end of the span 31. On the underside of the span 31 are formed: one or more protrusions 33; one or more notches 34; or both.

Barrier element 40 is a ramp which is formed on the modular connector 1 on the side of the guard cover 30 opposite the resilient leg 20 of the connector plug 10. In other words, barrier element 40 is formed adjacent the resilient leg 20 on the rear portion of the modular connector 1. The front portion of the modular connector is where the connector plug 10 is arranged.

Figure 3:
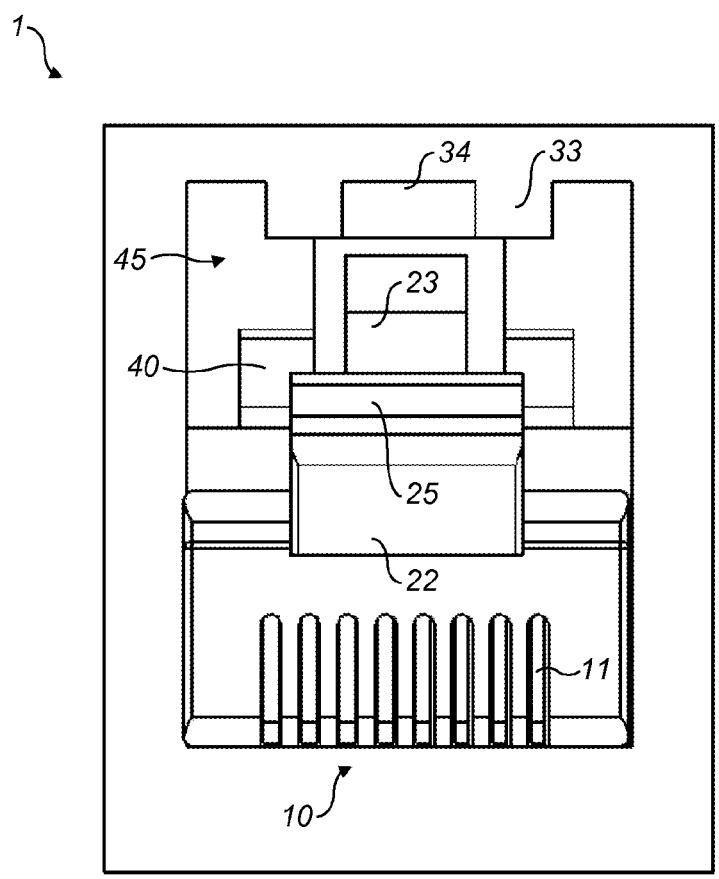
FIG. 3 shows an end view of the modular connector of FIG. 1.
Figure 4:
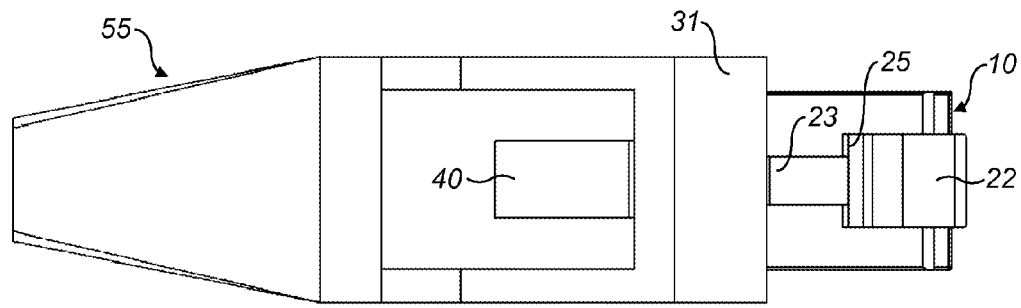
FIG. 4 shows a plan view of the modular connector of FIG. 1.
Figure 5:
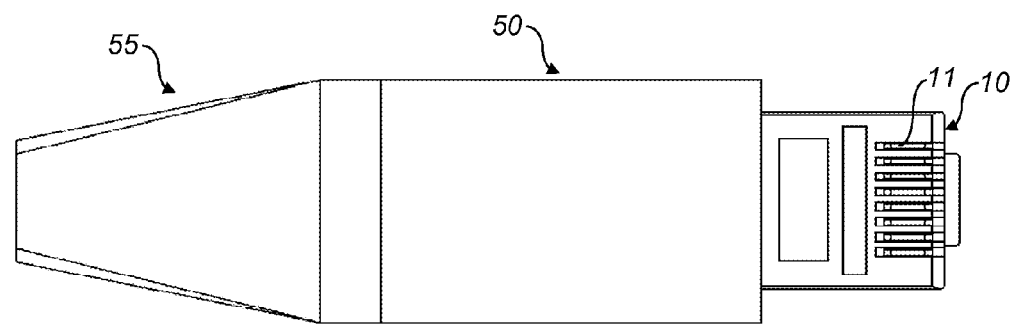
FIG. 5 shows a plan view (from the opposite direction to that of FIG. 4) of the modular connector of FIG. 1.

A region bounded by the bridge span 31, the bridge support 32, the modular connector plug 10 and the barrier element 40 defines an opening. Referring to FIG. 3, there is shown an end view of the modular connector 1 of FIG. 1. In this drawing, the opening 45 is visible. Also shown in this drawing are electrical contacts 11 on the modular connector plug 10.

Referring again to FIG. 1, a cable (not shown) can be received at the modular connector 1 through a rear portion 55 of the housing 50. The cable may be coupled to the modular connector plug 10 by crimping as usual, or other equivalent means as known to a person skilled in the art.

In use, the modular connector 1 is received into an associated socket (not shown). On entry into the socket, the end 23 of the resilient leg 20 is forced downwards towards the connector plug 10 by the perimeter of the socket. Once the lug 25 formed on the resilient leg 20 has moved downwards sufficiently to allow entry of the connector plug 10 into the socket, the resilient leg 20 springs back so that the lug 25 is restrained by a flange in the socket which inhibits removal of the connector 1 from the socket.

Subsequent removal of the connector 1 from the socket is achieved by depressing the end 23 of the resilient leg 20 such that the lug 25 passes below the restraining flange of the socket. Since the end 23 of the resilient leg 20 is located under the guard cover 30, however, it is not possible to depress the resilient leg 20 by hand, or in other words without the use of a tool. Instead, in order to remove the modular connector one from the socket, it is necessary to remove a corresponding removal tool.

Referring again to FIG. 1, there is shown a tool 100 of the present invention. The tool 100 comprises a tool body 110, a resilient arm 120 depending from the tool body, and a tongue 130 formed at the distal end of the resilient arm. The tool body 110 includes a recess adapted so that, when in use, it will at least partly surround a cable (not shown) connected to the modular connector 1. The resilient arm 120 is typically more resilient than the resilient leg 20 of the modular connector 1. The shape of the tongue 130 is adapted to fit through (match) the opening 45 under the bridge span 31. In particular, where the bridge span 31 or support 32 include one or more protrusions 33, one or more notches 34 or both, the shape of the tongue 130 is adapted to cooperate. Notch 131 is shown in FIG. 1.

In use, the tool 100 is positioned parallel to the elongate direction of the modular connector 1 on the side of the guard cover 30 away from the resilient leg 20. The tool is aligned by ensuring that the cable coupled to modular connector 1 is at least partly enclosed by the recess 125 of the tool 100.

The tool 100 is then moved in a forward direction generally parallel to the direction of elongation, towards the guard cover 30. The resilient arm 120 of the tool 100 makes contact with the barrier element 40 of the modular connector 1, which is ramp-shaped. Further movement in that forward direction causes the resilient arm 120 of the tool 100 to slide up the barrier element 40. As noted above, the tongue 130 is adapted to fit through the opening 45 beneath the bridge span 31. Continued movement of the tool 100 will cause the tongue 130 to pass through the opening beneath the bridge span 31.

Once the tongue has passed through the opening, the tongue 130 makes contact with the resilient leg 20 of the modular connector 1. Since the resilience of the resilient arm 120 of the tool 100 is typically greater than the resilience of the resilient leg 20 of the modular connector 1, the resilient arm 120 forces the resilient leg 20 downwards towards the modular connector plug 10. Consequently, the connector 1 is then removable from the socket through downward motion of the lug 25 in the manner described herein.

Once the connector 1 has been removed from the socket, the tool 100 remains attached to the connector 1 because the tongue 130 of the tool 100 remains on the side of the guard cover 30 closer to the resilient leg 20. Since the resilient arm 120 of the tool 100 is more resilient than the resilient leg 20 of the modular connector 1, the tool cannot easily be removed from the modular connector 1.

Referring once again to FIG. 1, there is also provided a cap 200, comprising an aperture 220, a cap projection 210 mounted at one end of the cap and a resilient clip 230.

The aperture 220 is adapted to receive a modular connector plug 10 of the modular connector 1. In use, the cap 200 is moved towards the connector plug 10 in a direction so as to receive the connector plug 10 into the aperture 220 of the cap 200. In consequence of this movement, the ramp-shaped projection 210 slides underneath the tongue 130 at the distal end of the resilient arm 120 of the extraction tool 100. With continued movement in the same direction, the tongue 130 is forced up by the ramp-shaped projection 210, which in turn forces the resilient arm 120 of the tool 100 up towards the aperture beneath the bridge span 31. Once the resilient arm 120 of the tool 100 is in line with the aperture beneath the bridge span 31, the tool 100 can be removed simply by moving the tool 100 in the direction of the cable, away from the modular connector 1 and guard cover 30.

Moreover, as a result of the movement of the cap 200, the resilient leg 20 of the modular connector 1 is received beneath the resilient clip 230 of the cap 200 which holds the cap 200 in place at the end of the connector 1. Thus, the cap will, by default, remain in place on the end of the modular connector 1 when the connector 1 is not connected in a socket. The resilient clip 230 incorporate a flange (not shown) similar to a modular connector socket, against which the lug 25 of the resilient leg 20 abuts.

The modular connector 1, extraction tool 100 and cap 200 may be made from a thermosetting plastic. Since a large number of arrangements of modular connector 1, guard cover 30, barrier element 40 and aperture 45 are contemplated by the invention, and each such arrangement has at least one corresponding tool 100, it may be that the corresponding connector and tool include some means of identification in order for the user easily to identify the correspondence between the connector 1 and tool 100. For example, corresponding connectors and tools may be formed in the same colour. The corresponding cap 200 may also be formed in the same colour.

The housing 50 of the modular connector 1 may comprise any number of components. The connector plug 10 may be formed by the housing 50. Also, the housing 50 may include a recess (not shown) for receiving a radio frequency identification (RFID) tag.

Figure 6:
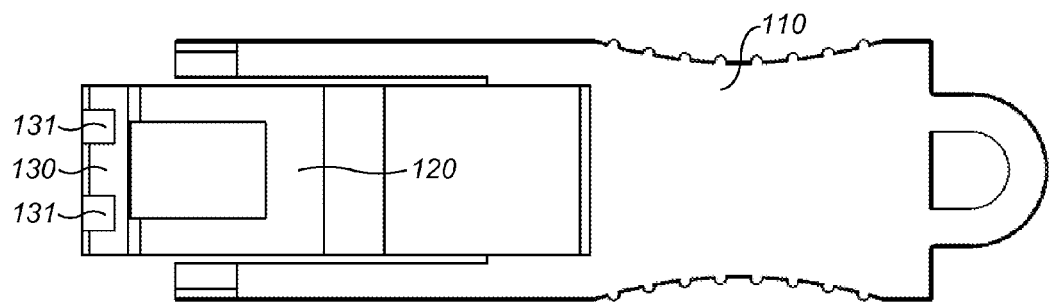
FIG. 6 shows a plan view of the tool of FIG. 1.
Figure 7:
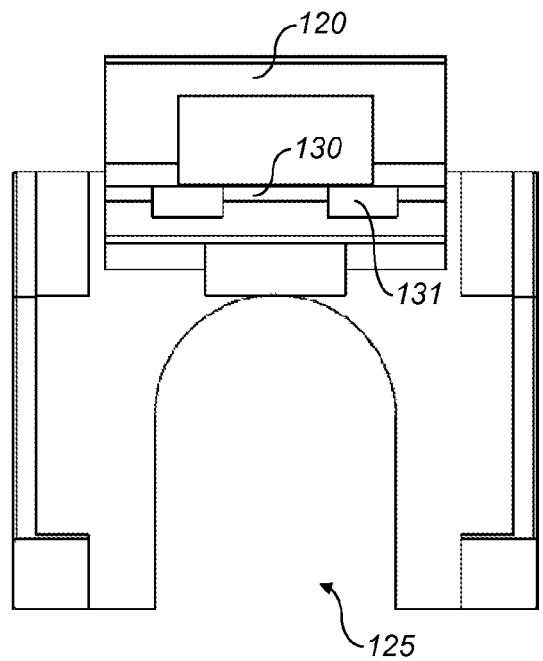
FIG. 7 shows an end view of the tool of FIG. 1.
Figure 8:
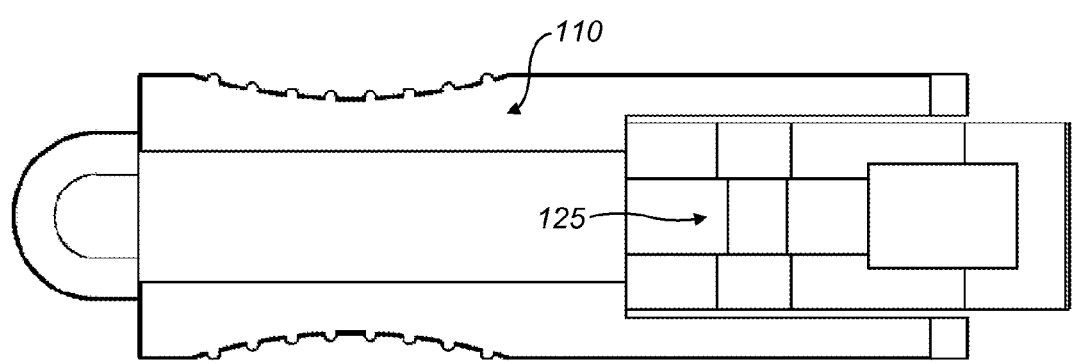
FIG. 8 shows a plan view (from the opposite direction to that of FIG. 6) of the tool of FIG. 1.

FIGS. 2 to 5 show alternative views of the modular connector 1 shown in FIG. 1. Where the same features are illustrated, identical reference numerals have been used. FIGS. 6 to 8 show alternative views of the extraction tool 100 shown in FIG. 1. Again, where the same features are illustrated, identical reference numerals have been employed.

Although one embodiment of the present invention has been described above, the skilled person will contemplate various modifications. For example, although the cap 200 is described as having a resilient clip 230 with a flange, the flange may be provided in a different way, for example by the body of the cap 200. Alternatively, other means for retaining the lug 25 of the resilient leg 20 may be provided.

In preferred embodiments, an additional security feature is provided. Specifically, the guard cover is arranged to extend in the longitudinal direction (in other words, the direction of elongation of the plug 10) at least to the location of a front face of the associated socket, when the plug 10 is fully inserted into the socket. This prevents access to the resilient leg of the modular connector in its direction of depression. By providing this additional feature, accessing the resilient leg at a location close to the front face of the associated socket is precluded. This additional security feature can be implemented in a number of ways, one of which will now be described.

Figure 9A:
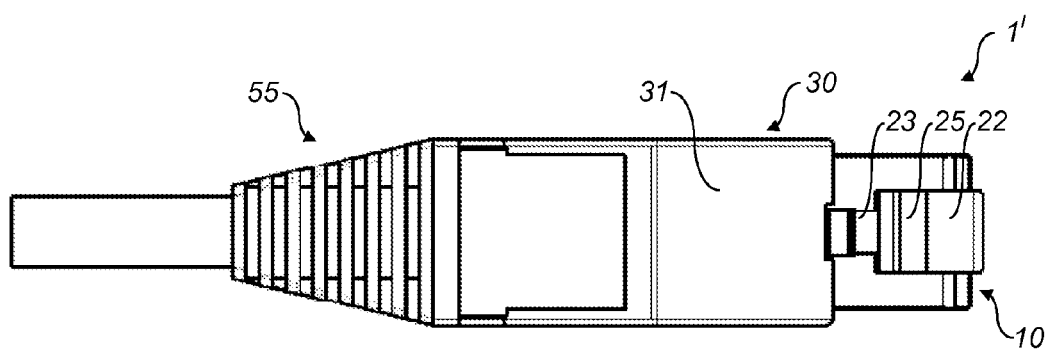
FIG. 9a shows a plan view of a second embodiment of a modular connector according to the present invention.
Figure 9B:
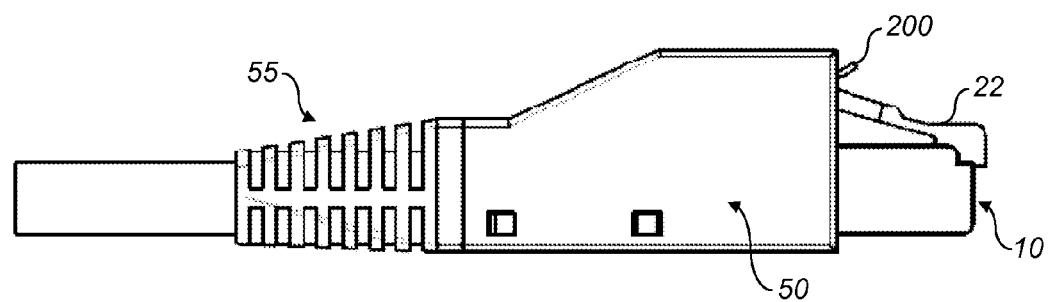

In FIG. 9a, there is shown a plan view of a modular connector 1' according to a second embodiment of the present invention. Where the same features are indicated as used in the embodiment of FIG. 1, identical reference numerals have been used. Flap 200 is provided adjacent the span 31 to prevent access to the end 23 of the resilient leg in its direction of depression. FIG. 9b shows a side view of the embodiment of FIG. 9a.

Figure 9C:
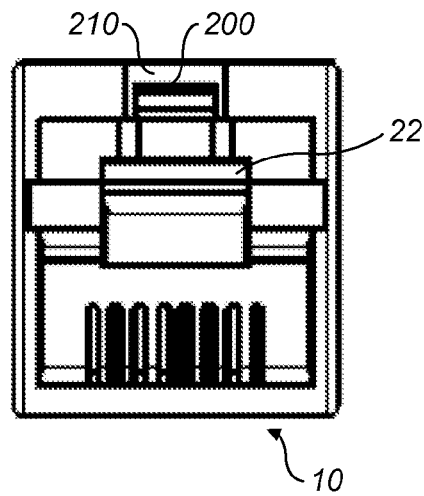

FIG. 9c shows a front end view of the embodiment of FIG. 9a. One end of the flap 200 is pivoted against the bridge span 31. The flap 200 can therefore move with respect to the bridge span 31. Also, the bridge span 31 extends closer to the front part of the connector plug 10 in the longitudinal direction than in other embodiments. The bridge span 31 is further adapted with an associated notch 210. The notch 210 is positioned such that the flap 200 is pushed into the notch 210 when the modular connector is inserted into a socket.

Figure 9D:
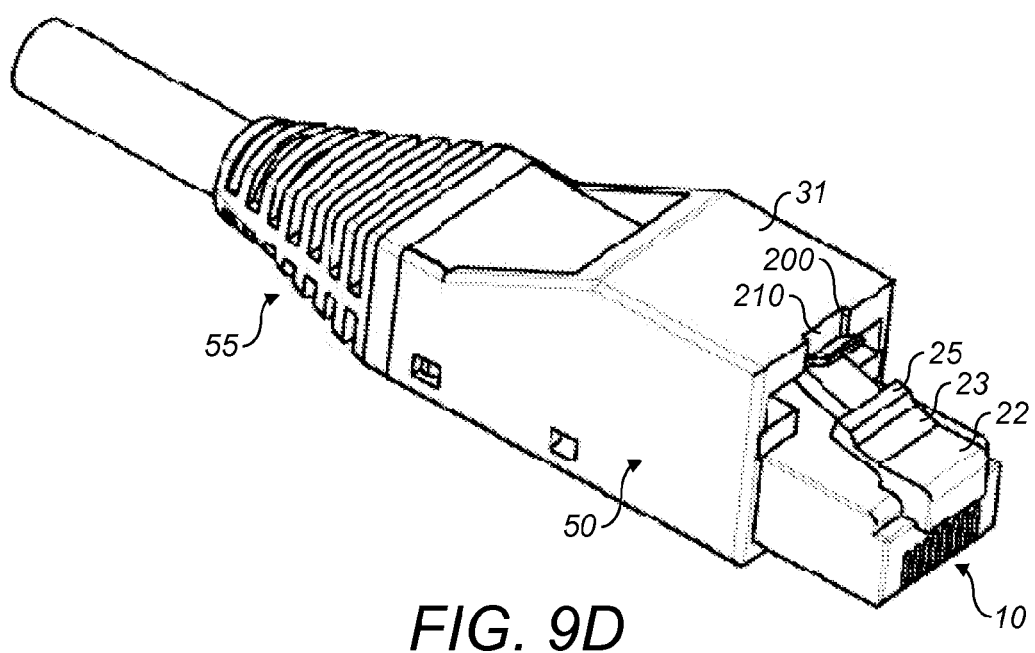

FIG. 9d shows a perspective view of the embodiment of FIG. 9a. The flap 200 is shaped such that, when it is pushed into the notch 210, a portion of the flap 200 extends in the longitudinal direction at least to the location of a front face of the associated socket. In particular, an end of the flap 200 is angled and shaped such that, when the flap 200 is pushed into the notch 210, it extends in the longitudinal direction further forward than the bridge span 31. Also, at least part of the flap 200 is horizontal, but it parallel with the span 31. These features prevent access to the resilient leg 23 at a location close to the front face of the associated socket.

Advantageously, the flap 200 may be integrally formed or moulded with a guard cover. No modification is required to an associated keystone in order to accommodate the flap 200, since this is pushed into the notch 210 when the connector is inserted into a socket.

Figure 10A:
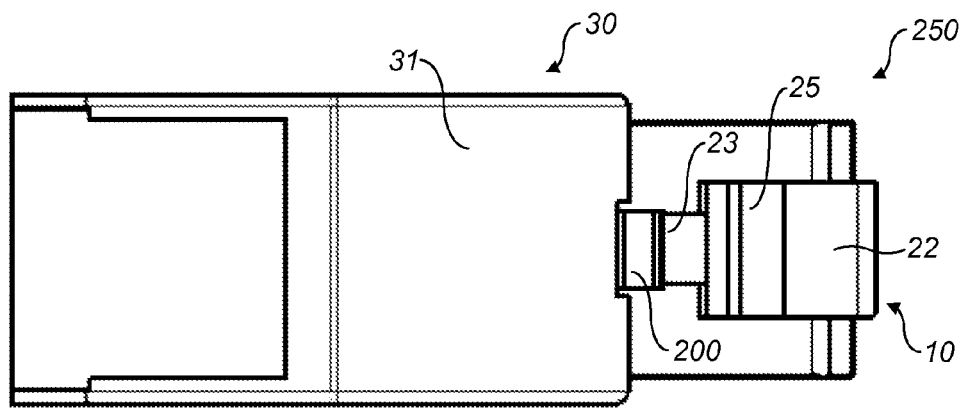
FIG. 10a shows a plan view of an embodiment of a blanking plug in accordance with the present invention.

FIG. 10a shows a blanking plug 250 according to an embodiment of the invention in plan view. The blanking plug 250 of the specific example shown in FIG. 10a is similar to the modular connector 1' shown in FIG. 9a, but a rear portion 55 of the housing 50 is not provided. Instead, the housing 50 is sealed at its rear portion.

The blanking plug 250 may be used to plug a socket when the socket is not being used to carry a signal. When the blanking plug 250 is in use with a socket, the plug prevents the ingress of dirt and contaminants which may, if allowed to enter, degrade quality when the socket is again used with an electrically connected plug.

Where the blanking plug is provided with a guard cover which inhibits manual release of the blanking plug from a socket into which it is received, the blanking plug may only be removed using the corresponding tool. Advantageously, therefore, this prevents an unauthorised party from removing the blanking plug. This in turn prevents an unauthorised party from inserting an unauthorised modular connector into the socket.

Figure 10B:
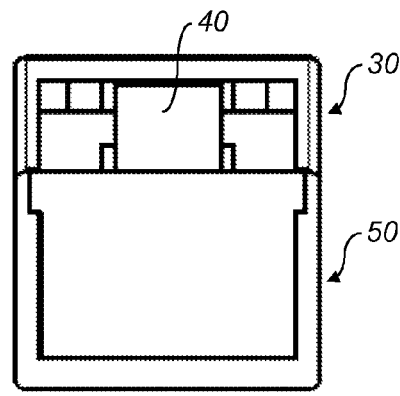
Figure 10C:
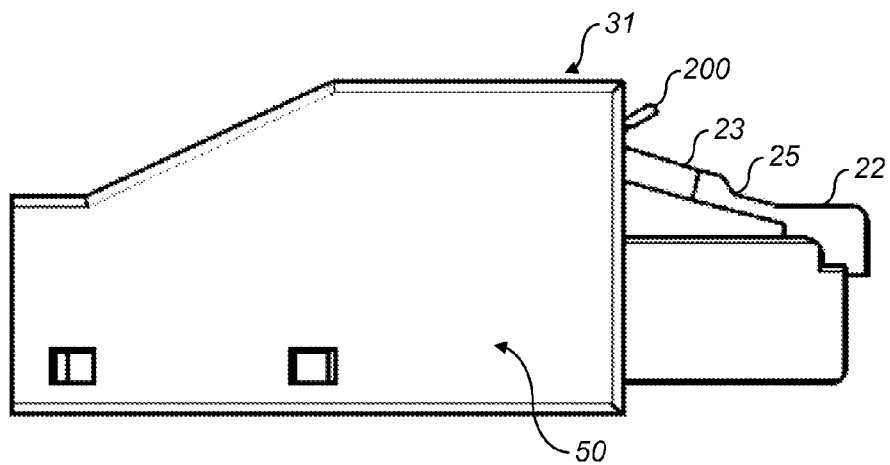
Figure 10D:
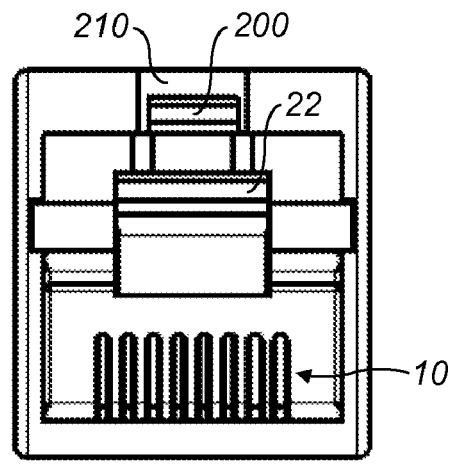
Figure 10E:
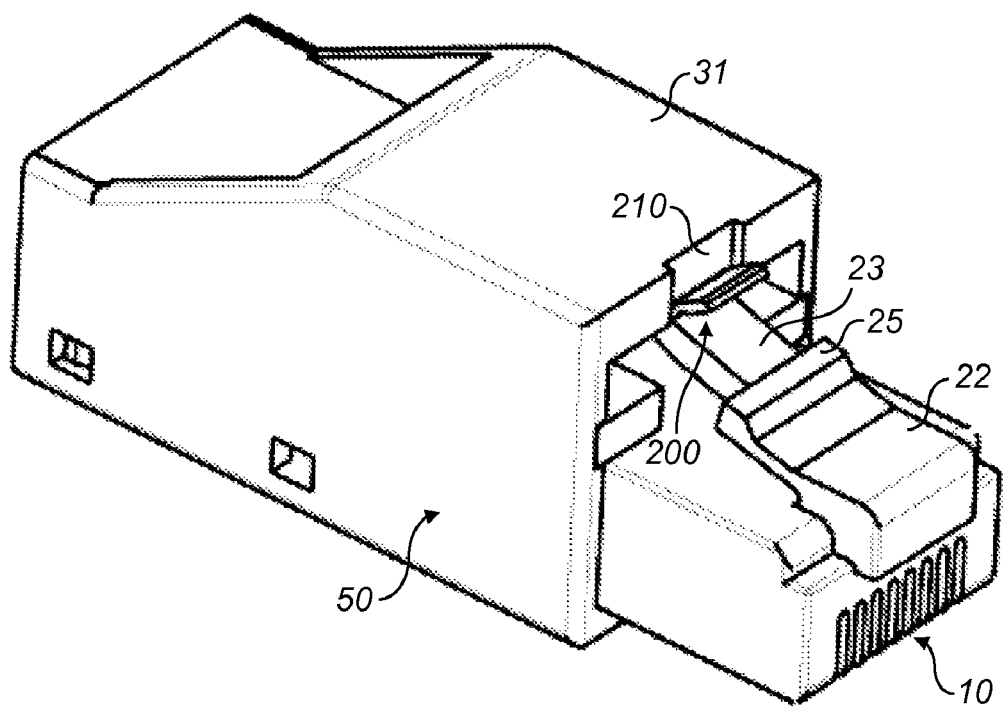

FIG. 10b shows a rear end view of the embodiment of FIG. 10a. FIG. 10c shows a side view of the embodiment of FIG. 10a. FIG. 10d shows a front end view of the embodiment of FIG. 10a. FIG. 10e shows a perspective view of the embodiment of FIG. 10a.

The external housing used for the blanking plug 250 may alternatively be used to provide a loopback connector. In the loopback connector, electrical connections are provided to couple the signal received when the plug 10 is inserted in an associated socket such that the received signal is delivered back into the socket. The electrical connections on the plug 10 include connections for receiving and transmitting signals between the plug 10 and associated socket.

Figure 11:
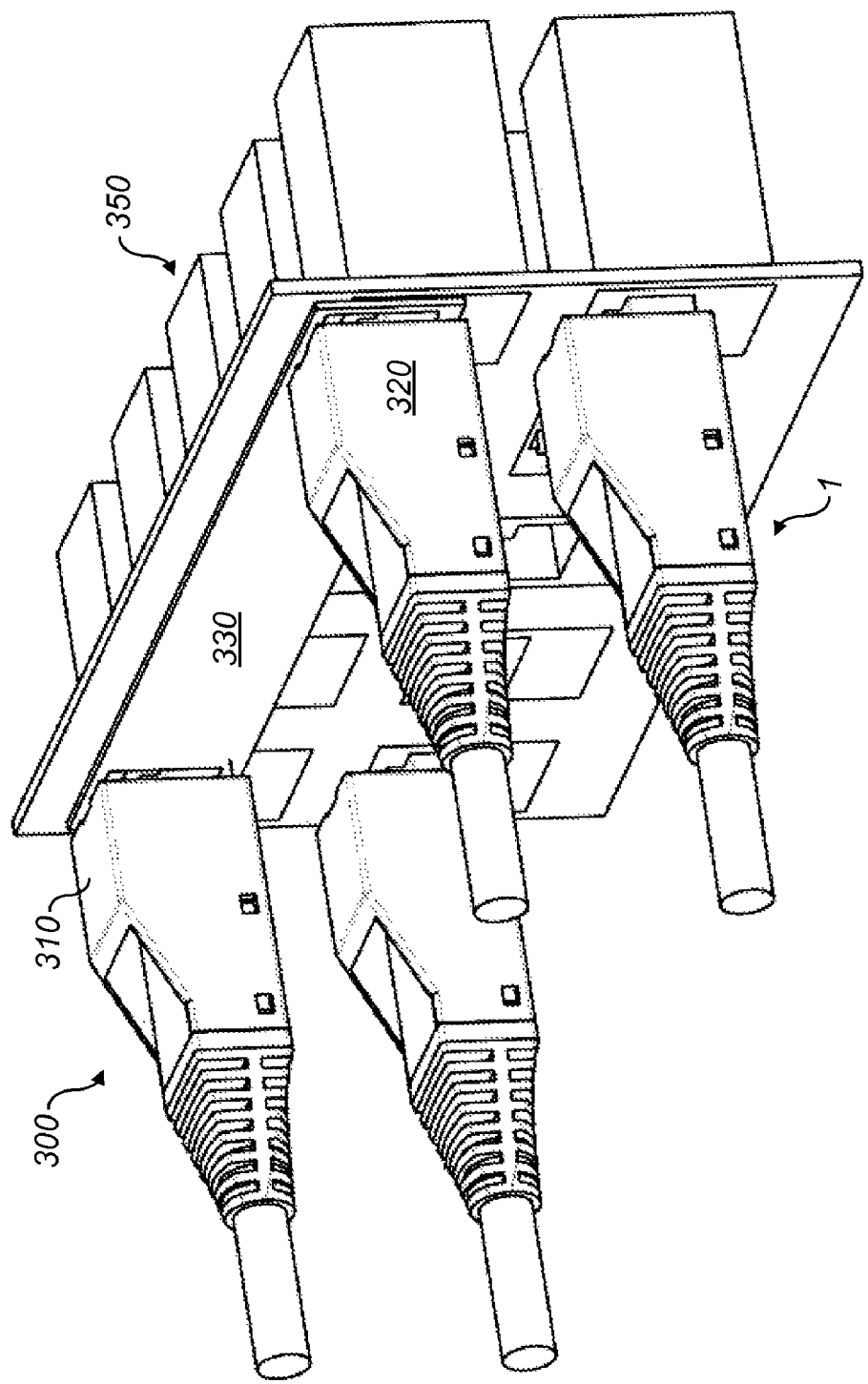
FIG. 11 shows a blanking plate in accordance with the present invention.

FIG. 11 shows a blanking plate according to an embodiment of the present invention. Blanking plate 300 comprises: a first modular connector 310; a second modular connector 320; and a plate 330. The configuration of the blanking plate 300 means that when modular connector 310 and modular connector 320 the plate 330 prevents any modular connectors being inserted into the blocked sockets. Also shown in FIG. 11 are an associated socket panel 350 and further modular connectors 1. The plate 330 is metal, but may alternatively be plastic or another material.

Where the first modular connector 310 and the second modular connector 320 are provided with a guard cover which inhibits manual release of the modular connectors from the sockets, the blanking plate may only be removed using a corresponding tool or tools to allow release of the first modular connector 310 and the second modular connector 320 from the respective sockets. Advantageously, therefore, this prevents an unauthorised party from removing the blanking plate 300. The first modular connector 310 and the second modular connector 320 may be replaced by corresponding blanking plugs as appropriate.

Furthermore, a patch board of sockets may be provided, all of which are populated with a blanking plug or loopback connector or modular connector. The guard cover of each blanking plug, loopback connector or modular connector would render the respective component incapable of removal from its socket without the corresponding tool. This in turn prevents an unauthorised party from inserting an unauthorised connector into any of the sockets in the patch board.

Figure 12A:
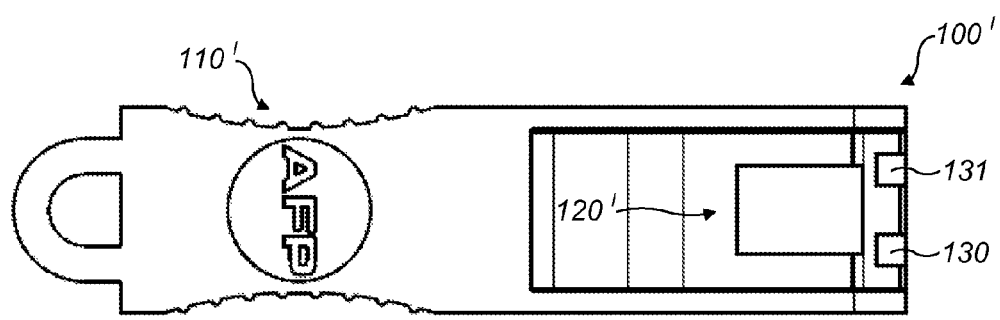
FIG. 12a shows a plan view of a second embodiment of a tool for removing a modular connector in accordance with the present invention.

FIG. 12a shows a plan view of a tool 100' for removing a modular connector from an associated socket according to a second, preferred embodiment of the present invention. The tool 100' is similar to the tool 100 shown in FIGS. 6 to 8 and where the same features have been included, identical reference numerals have been used.

The tool 100' comprises: a modified tool body 110'; a modified resilient arm 120'; and tongue 130 formed at the distal end of the resilient arm 120'. The modified tool body 110' is thinner than the tool body 110 shown in FIGS. 6 to 8. Moreover, the modified resilient arm 120' bends into the tool body 110'. Notch 131 is formed on tongue 130 to cooperate with an corresponding projection on the bridge span of the guard cover on an associated modular connector.

Modular connectors may typically have a high packing density. An extraction tool that surrounds the modular connector may not always be practical. The second, preferred embodiment of the extraction tool 100' advantageously inserts into the rear of the modular connector to allow depression of the connector's resilient leg and extraction of the connector from a socket.

Figure 12B:
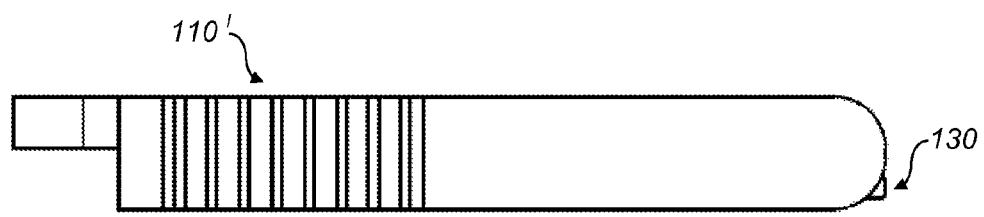
Figure 12C:
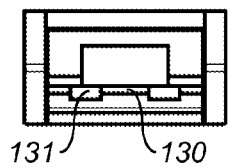
Figure 12D:
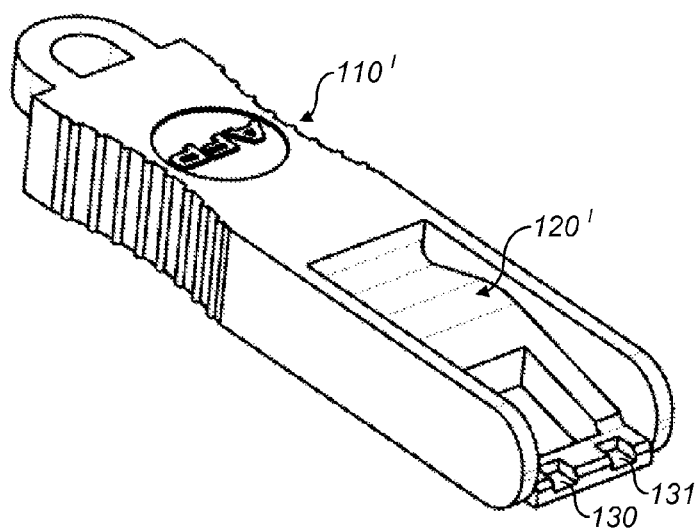

FIG. 12b shows a side view of the tool of FIG. 12a. FIG. 12c shows a front end view of the tool of FIG. 12a. FIG. 12d shows a perspective view of the tool of FIG. 12a.

In an alternative embodiment, an extraction tool may comprise a raised portion of the resilient arm. The raised portion may be coupled to the tool body using a resilient bias, such as a spring.

The invention claimed is:

1. A modular connector comprising:
   a connector plug, configured to be inserted into an associated socket in a first longitudinal direction;
   a resilient leg, depending at a first end thereof from the connector plug, and having a depressible part, distal therefrom, depressible towards the connector plug; and
   a guard cover affixed to the connector plug, configured to prevent access to the depressible part of the resilient leg in its direction of depression, but to permit access to the resilient leg in the first longitudinal direction through a single access aperture, the single access aperture being aligned with the depressible part of the resilient leg on an axis parallel with the first longitudinal direction, to allow depression of the resilient leg through the single access aperture by directly contacting the resilient leg with a tool inserted through the single access aperture.

2. The modular connector claim 1, wherein the connector plug and at least a part of the guard cover are formed as a unitary element.

3. The modular connector of claim 1, further comprising a tool, the tool comprising:
   a tool body;
   a resilient arm depending from the tool body; and
   a tongue formed upon a distal end of the resilient arm and adapted to pass through the single access aperture of the modular connector and depress the resilient leg of the modular connector by directly contacting the resilient leg with the resilient arm.

4. The tool of claim 3, wherein the tool body defines an inner volume for receiving a rear portion of the connector plug.

5. The tool of claim 3, wherein the tongue of the tool comprises a protrusion.

6. The tool of claim 3, further comprising a cap for removal of the tool from the single access aperture of the modular connector.

7. The tool of claim 3, further comprising:
   a cap having a body that defines an inner volume for receiving a front portion of the modular connector.

8. The tool of claim 7, wherein the cap further comprises a flange for abutting a lug on the resilient leg of the modular connector.

9. The tool of claim 7, wherein the cap is generally elongated and further comprises an arm projecting from the cap body along the direction of elongation.

10. The tool of claim 9, wherein the arm is ramp-shaped at its distal end.

11. The modular connector of claim 1, wherein the guard cover includes a bridge over the resilient leg, the bridge having bridge supports surrounding the resilient leg and a bridge span joining the supports and spaced from the resilient leg.

12. The modular connector of claim 11, wherein the modular connector is a blanking plug that functions to plug a socket when the socket is not being used to carry a signal, and the blanking plug prevents ingress of dirt and other contaminants into the socket.

13. The modular connector of claim 11, further comprising:
   a tool body;
   a resilient arm depending from the tool body; and
   a tongue formed upon a distal end of the resilient arm and adapted to pass through the single access aperture of the modular connector and depress the resilient leg of the modular connector by directly contacting the resilient leg with the tongue.

14. The modular connector of claim 13, wherein at least a portion of the modular connector and at least a portion of the tool body adapted to pass through a key-like formation in the single access aperture are a similar color to indicate to a user that the tool is properly keyed to pass through the single access aperture and directly contact and depress the resilient leg on the connector plug.

15. The modular connector of claim 11, wherein a region bounded by the bridge span, the bridge supports, and the connector plug defines the single access aperture.

16. The modular connector of claim 15, further comprising a ramp on the connector plug that is at least partially located within the single access aperture.

17. The modular connector of claim 15, wherein at least one of the bridge span, the bridge supports, and the connector plug includes at least one protrusion which functions as a key to prevent a non-matching tool from entering the single access aperture and depressing the resilient leg.

18. The modular connector of claim 17, further comprising:
   a tool sized for entering the single access aperture, wherein the tool includes a key-like formation that aligns with the at least one protrusion in one of the bridge span, bridge supports, and connector plug to allow the tool to enter the single access aperture and depress the resilient leg.

19. The modular connector of claim 15, wherein at least one of the bridge span, the bridge supports, and the connector plug includes at least one notch which functions as a key to prevent a non-matching tool from entering the single access aperture and depressing the resilient leg.

20. The modular connector of claim 19, further comprising:
   a tool sized for entering the single access aperture, wherein the tool includes a key-like formation that aligns with the at least one notch in one of the bridge span, bridge supports, and connector plug to allow the tool to enter the single access aperture and depress the resilient leg.

* * * * *